US008612385B2

(12) United States Patent
Schine

(10) Patent No.: US 8,612,385 B2
(45) Date of Patent: Dec. 17, 2013

(54) DATABASE REPLICATION SYSTEM

(75) Inventor: Gabriel Schine, San Francisco, CA (US)

(73) Assignee: TiVo Inc., Alviso, CA (US)

(*) Notice: Subject to any disclaimer, the term of this patent is extended or adjusted under 35 U.S.C. 154(b) by 771 days.

(21) Appl. No.: 12/254,842

(22) Filed: Oct. 21, 2008

(65) Prior Publication Data

US 2010/0114821 A1 May 6, 2010

(51) Int. Cl.
G06F 7/00 (2006.01)
G06F 17/00 (2006.01)

(52) U.S. Cl.
USPC .......................................... 707/614; 707/623

(58) Field of Classification Search
USPC ......... 707/613, 614, 616, 620, 622, 623, 632, 707/692
See application file for complete search history.

(56) References Cited

U.S. PATENT DOCUMENTS

| | | | | |
|---|---|---|---|---|
| 6,295,541 | B1 * | 9/2001 | Bodnar et al. | 1/1 |
| 6,810,405 | B1 * | 10/2004 | LaRue et al. | 707/613 |
| 7,565,419 | B1 * | 7/2009 | Kwiatkowski et al. | 709/223 |
| 7,899,883 | B2 * | 3/2011 | Rasmussen et al. | 709/217 |
| 2004/0139083 | A1 * | 7/2004 | Hahn et al. | 707/100 |
| 2004/0230615 | A1 * | 11/2004 | Blanco et al. | 707/104.1 |
| 2005/0226059 | A1 * | 10/2005 | Kavuri et al. | 365/189.05 |
| 2006/0047713 | A1 * | 3/2006 | Gornshtein et al. | 707/202 |

OTHER PUBLICATIONS

Sennhauser. "MySQL Multi-Master—Single-Slave—Replication (aka Saskia)" [online]. Archived at archive.org on Jan. 13, 2007. [retrieved on Jul. 14, 2011]. Retrieved from the Internet <URL http://web.archive.org/web/20070113014358/www.shinguz.ch/MySQL/mm-single-slave-repl.pdf> 5 pages.*
Madar. "MySQL on Rails: Custom replication" [online], Mar. 12, 2008. Archived at archive.org on May 27, 2008. [retrieved on Jul. 14, 2011]. Retrieved from the Internet <URL: http://web.archive.org/web/20080527013127/http://mysqlonrails.blogspot.com/2008/03/custom-replication.html> 4 pages.*

* cited by examiner

Primary Examiner — James E Richardson
(74) Attorney, Agent, or Firm — Hickman Palermo Truong Becker Bingham Wong LLP; Kirk D. Wong

(57) ABSTRACT

A method and apparatus for updating a slave system in a multi-master replication network is provided. The method involves executing a first event on a first master system within the multi-master replication network and executing a second event on a second master system in the multi-master replication network, where the first event and the second event are identical. The method further involves selecting an event from the first event and the second event and executing the selected event on a slave system.

15 Claims, 6 Drawing Sheets

DATABASE REPLICATION SYSTEM

FIELD OF THE INVENTION

The present invention relates generally to multi-master replication networks. The invention relates more specifically to a modifying a data repository associated with a slave system in a multi-master replication network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The introduction of multi-master replication to the database world has revolutionized the way databases are made available to a process, system and/or user. Multi-master replication is used to provide high availability of master systems while guarding against failure using data redundancy in different nodes. Specifically, each node corresponds to a master system that can be used to add, delete, and modify a corresponding data repository. Further, when the data repository corresponding to one master system is modified, the other master systems within the multi-master replication network are notified. Upon notification, the other master systems within the multi-master replication network modify their respective data repositories in order to maintain consistency and redundancy among all the master systems within the multi-master replication network.

However, in a multi-master replication network, delays between updates from one master system to another master system may result in data inconsistencies for a temporary period of time. Further, failure of one master system may result in the loss of data (e.g., modification of an associated data repository) if the data has not yet been replicated in the other master systems within the multi-master replication network. Accordingly, as described with reference to FIG. 1., each master system (e.g., master system 110 and master system 120) within the multi-master replication network may be backed up with a corresponding slave system (e.g., slave system 115 and slave system 125) that stores a duplicate copy of the data stored on the respective associated master system.

BRIEF DESCRIPTION OF THE DRAWINGS

The present invention is illustrated by way of example, and not by way of limitation, in the FIGs. of the accompanying drawings and in which like reference numerals refer to similar elements and in which.

DETAILED DESCRIPTION

A method and apparatus for data repository updates in a multi-master replication network is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A technique for using a slave system concurrently with multiple master systems in a multi-master replication network is provided herein. The technique allows for executing an event on a master system within the multi-master replication network and replicating the event by executing the same event on other master systems within the multi-master replication network. The technique further allows for identifying one of the executed identical events as a selected event and executing the selected event on a slave system.

Basic Architectural Overview

Figure 1:
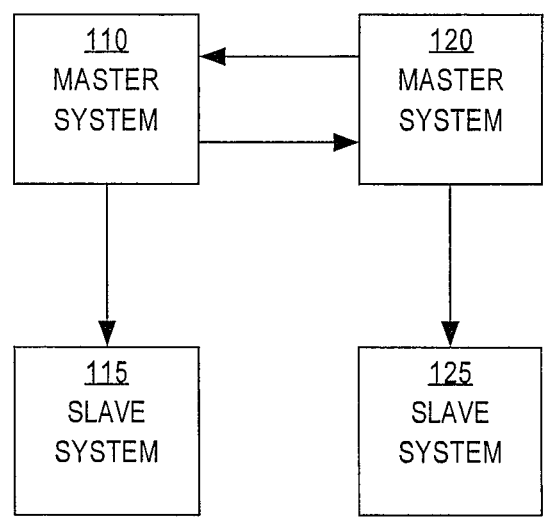
FIG. 1 is a schematic diagram that illustrates an architecture of a multi-master replication network.
Figure 2A:
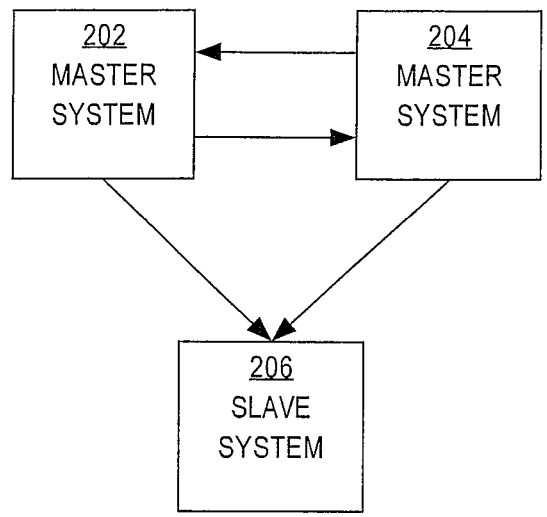
FIG. 2A is a schematic diagram that illustrates an exemplary architecture of a multi-master replication network according to one embodiment of the invention.

An embodiment of the invention can be described with reference to FIG. 2A, block diagram that illustrates a logical architecture of a multi-master replication network. As shown in FIG. 2A, the multi-master replication network includes multiple master systems (e.g., master system 202 and master system 204) and at least one slave system (e.g., slave system 206) which are communicatively coupled within the multi-master replication network through any communication interface, such as an Ethernet interface or wireless communications port. The multi-master replication network may be implemented by any medium or mechanism that provides for the exchange of data between devices within the network. Examples of the multi-master replication network include, without limitation, a network such as a Local Area Network (LAN), Wide Area Network (WAN), the Internet, Intranet, Extranet with terrestrial, satellite or wireless links, etc. Alternatively or additionally, any number of systems connected within the network may also be directly connected to each other through a communications link.

Each master system within multi-master replication network may correspond to a process, program, service, computer system or computer system cluster that includes functionality to maintain a corresponding data repository by executing events for updating the corresponding data repository. Each corresponding data repository may be on the same system as the master system itself or may be maintained on a separate device. Each data repository include a relational database, a post-relational database, an object database, a flat file, hierarchical file, network based database, dimension based database, or any other datastore well known in the art. For example, a data repository may be maintained as a table of a MySQL database. Those skilled in the art will appreciate that elements or various portions of data stored in the data repository may be distributed and stored in multiple data repositories. In addition, data in each data repository may be verified against data stored in other repositories.

The events executed by a master system to maintain and/or update a corresponding data repository include but are not limited to additions, deletions, and modifications. The events may include data repository updates resulting from client requests and/or events that are a part of routine maintenance including but not limited to data verification and data synchronization. Master systems receiving requests from clients for events to be executed on a corresponding data repository are originating systems with respect to those events. Master systems executing events on a corresponding data repository based on execution of the event on other master systems are non-originating systems with respect to those events.

Figure 2B:
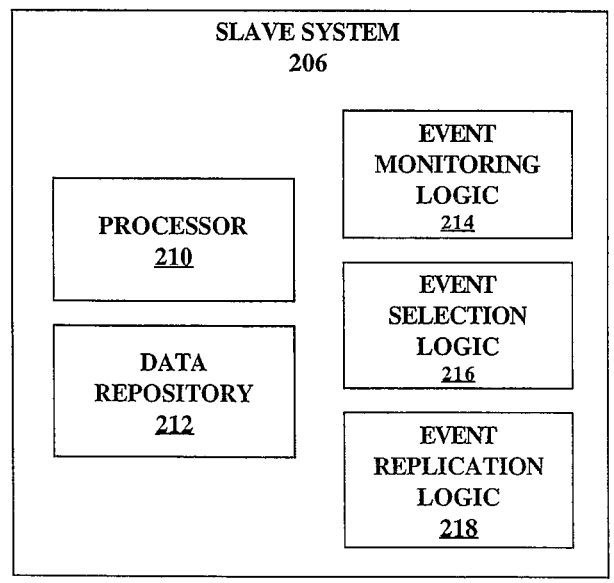
FIG. 2B is a schematic diagram that illustrates components of a slave system according to one embodiment of the invention.

The slave system 206 corresponds to a process, program, service, computer system, or computer system cluster that includes functionality to store and/or forward information. In one or more embodiments of the invention, the slave system 206 includes functionality to execute a database instance of the same database executing on master system 202 and/or master system 204. In one embodiment of the invention, the slave system may execute instances of different databases than the master systems. FIG. 2B shows an exploded view of the slave system 206 to illustrate different components within the slave system 206. As shown in FIG. 2B, the slave system 206 includes a processor 210, a data repository 212, an event monitoring logic 214, an event selection logic 216, and an event replication logic 218. Although shown on the slave system 206 for illustration, one skilled in the art will appreciate that some of the components may be distributed over different systems and/or devices within the multi-master replication network. For example, the event monitoring logic 214 may reside on the master system 202 and/or master system 204. Another example may involve the event selection logic 216 located on a separate device communicatively coupled with the slave system 206.

Continuing with FIG. 2B, the data repository 212 is essentially similar to the data repositories corresponding to the master systems, described above. In one or more embodiments of the invention, the data repository 212 may be a backup repository such that events executed on data repository 212 are replications of events executed on other data repositories.

In one or more embodiments of the invention, the event monitoring logic 214 corresponds to a process, program, component, and/or system configured to monitor events executed on the master system 202 and the master system 204. Specifically, the event monitoring logic 214 may be configured to monitor data repositories associated with the master system 202 and master system 204 to identify updates, deletions, and additions to the data repositories. In another embodiment of the invention, the event monitoring logic 214 may be configured to receive any commands to be executed on the data repositories associated with the master systems 202 and 204. For example, the master system 202 may receive a MySQL command from a client system to be executed on a data repository associated with the master system 202. In this example, the event monitoring logic 214 may be configured to obtain the MySQL command to be executed or already executed on a MySQL database associated with the master system 202.

In one or more embodiments of the invention, the event selection logic 216 corresponds to a process, program, component, and/or system configured to select an event of identical events executed on the master system 202 and the master system 204. Specifically, the event selection logic 216 may be configured to determine that two events executed on the master system 202 and the master system 204, respectively, are identical and select one event of the two events. In another embodiment of the invention, the event selection logic 216 may be configured to select events executed on a master system designated as the live master system by a process or user. For example, the event selection logic 216 may be configured by a user to select all events from a user-specified live master system within the multi-master replication network and ignore events from other master systems within the multi-master replication network. In another embodiment of the invention, the event selection logic 216 may be configured to select each unique event first executed. For example, the event selection logic 216 may select the first occurrence of the event on a master system and ignore duplicate occurrences of the event on other master systems. In another embodiment of the invention, the event selection logic 216 may select the event from the master system that first received the request for the event from a client system.

In one or more embodiments of the invention, the event replication logic 218 corresponds to a process, program, component, and/or system configured to replicate events executed on the master system 202 or the master system 204. In one embodiment of the invention, the event replication logic 218 may be configured to replicate an event executed on a data repository associated with a master system by executing the same event on a data repository (e.g., data repository 212) associated with the slave system 206. For example, if the master system 202 and the slave system 206 are executing instances of the same database, the event replication logic 218 may replicate events on the master system 202 by executing the commands, executed on the master system 202, on the slave system 206. In another embodiment of the invention, the event replication logic 218 may be configured to obtain information associated with an event executed on the master system 202 and based on the obtained information, execute an identical event on the slave system 206. For example, the event replication logic 218 may be able to generate a command for execution on the slave system 206 based on metadata associated with an event executed on the master system 202. Furthermore, the event replication logic 218 may be configured to execute the generated command on the slave system 206 to replicate the event executed on the master system 202.

Returning to FIG. 2A, one or more systems within the multi-master replication network shown in FIG. 2A may be communicatively coupled to one or more client systems (not shown) via terrestrial, satellite, or wireless links. The client system may be a server, mainframe, a desktop personal computer, laptop, PDA, television, cable box, satellite box, kiosk, telephone, mobile phone, portable media player, or any other suitable computing device. The client system may include any sort of interface adapted for use to access the multi-master replication network and any services provided by the systems within the multi-master replication network, in accordance with one or more embodiments of the invention. The interface of the client system may be a web interface, graphical user interface (GUI), command line interface, or other interface accessible through a computer system. In one or more embodiments of the invention, the interface includes one or more web pages that can be accessed from a computer with a web browser and/or internet connection. Alternatively, the interface may be an application that resides on a client system, and that communicates with the multi-master replication network via one or more network connections and protocols.

Functional Overview

Figure 3:
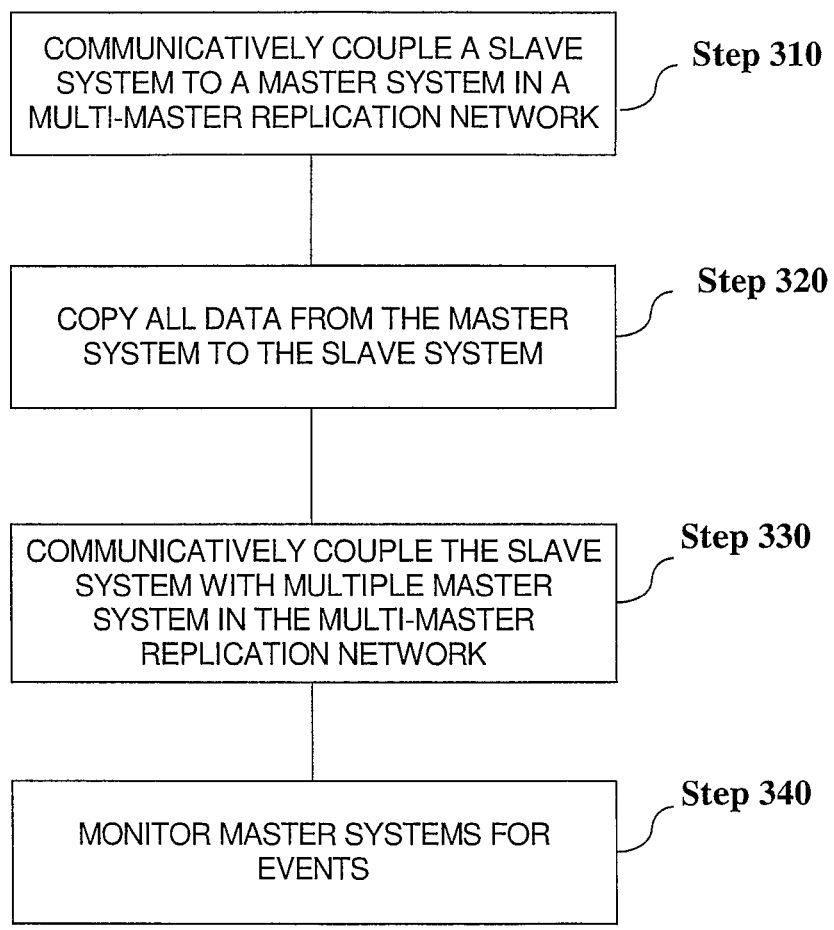
FIG. 3 is a flow diagram that illustrates a high level overview of one embodiment of a method for configuring a multi-master replication network according to one embodiment of the invention.

A high level flow of a setup for a multi-master replication network with at least one slave system according to an embodiment can be described with reference to FIG. 3. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, a slave system is communicatively coupled with a master system in a multi-master replication network directly or indirectly (e.g., over a network) (Step 310). Thereafter, all the data from the master system is copied onto the slave system such that the slave system includes a data repository identical to the data repository associated with the master system (Step 320). For example, each database record may be copied by executing events on an instance of the database running on the slave system. Another example may involve generating a ghost image of the master system and copying the ghost image onto the slave system to replicate the master system bit by bit. Further, any known methods in the art to initiate a slave system from a master system may be used.

Next, the slave system may be communicatively coupled with multiple master systems in the multi-master replication network (Step 330). The slave system may establish a continuous connection or may reconnect with the master systems as needed for transmission of event information. In one or more embodiments of the invention, the slave system may be concurrently connected to multiple master systems. In another embodiment of the invention, the slave system may be connected to one master system at a time and switch connection from one master system to another master system. For example, the slave system may, at given time, be communicatively coupled with the current active master system, the master system receiving client requests, the master system designated by a user, or based on another suitable criteria.

In accordance with one or more embodiments of the invention, one or more master systems communicatively coupled with the slave system may be monitored, as described below, for events (Step 340). Subsequent to the setup of multi-master replication network, as illustrated in FIG. 3, the multi-master replication network may be used in accordance with one or more embodiments of the invention, as illustrated in FIG. 4 and discussed below.

Figure 4:
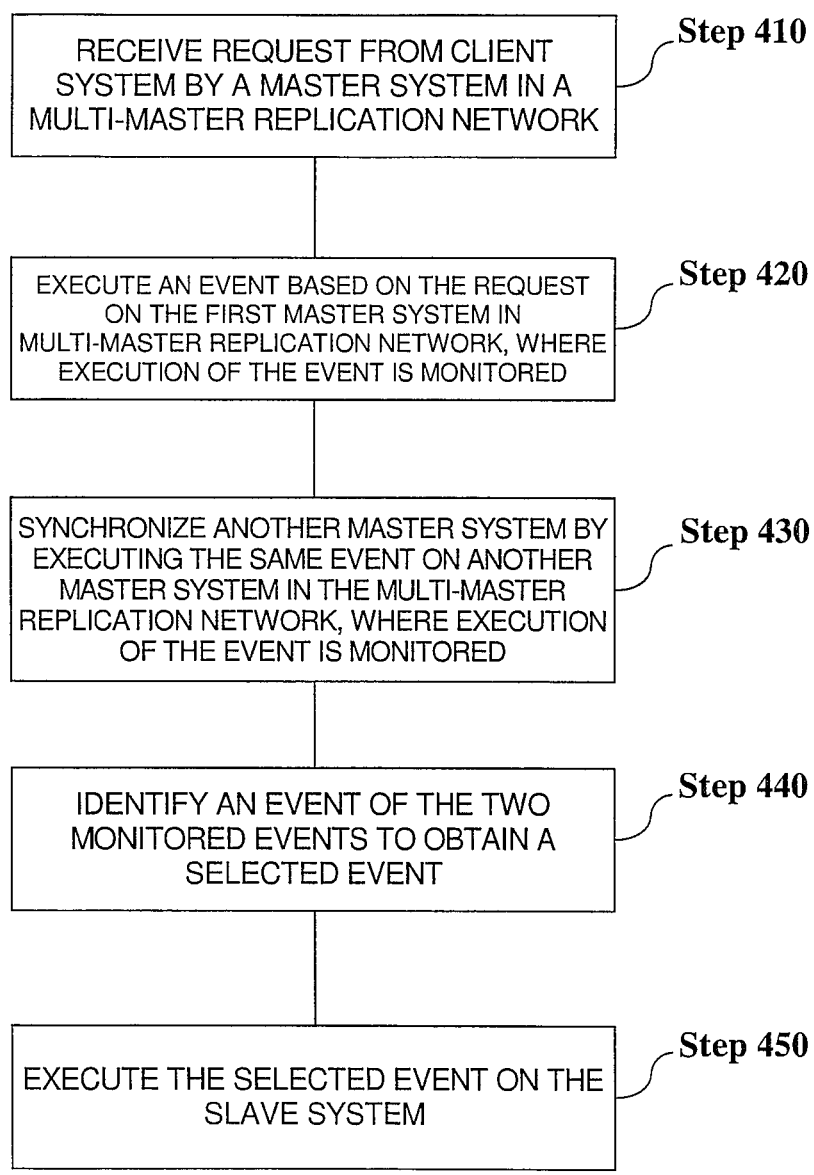
FIG. 4 is a flow diagram that illustrate a high level overview of one embodiment of a method for using a multi-master replication network according to one embodiment of the invention.

Specifically, FIG. 4 illustrates an exemplary functional flow within a multi-master replication network with at least one slave system. In one or more embodiments of the invention, one or more of the steps described below may be omitted, repeated, and/or performed in a different order. Accordingly, the specific arrangement of steps shown in FIG. 4 should not be construed as limiting the scope of the invention.

Initially, a request is received from a client system, in accordance with one or more embodiments of the invention (Step 410). The request may be received as a command in a database query language (e.g., a MySQL command), or may be more generic (e.g., a submission of a user's name for entering into a form). When a generic request is received, the generic request may be used to generate a corresponding command, i.e., event in a database query language. For example, if a generic request to count the number of jobs running is received from a client system. The following event may be generated to perform the request:

```
CREATE EVENT MONITOR_PROCESSLIST
ON SCHEDULE EVERY '1' SECOND
DO INSERT INTO db1.process_counter
    SELECT CURRENT_TIMESTAMP,COUNT(*)
    FROM INFORMATION_SCHEMA.PROCESSLIST;
```

This event will check every second "how many jobs are running" and will record the count in a table, along with the time that the count occurred. The process_counter will fill up, with 24*60*60=86,400 new rows every day.

In accordance with one or more embodiments of the invention, an event corresponding to the request is executed on a master system in the multi-master replication network (Step 420). Execution of the event may include modifying, adding, and/or deleting from a data repository associated with the master system. For example, execution of an event may involve adding a new record by inserting a new row with information into a database instance. For example, the following event will drop table in database test.

```
CREATE EVENT DROP_TEST_T
AT TIMESTAMP(CURRENT_DATE,'23:59:59')
DO DROP TABLE test.t;
```

Furthermore, in accordance with one or more embodiments of the invention, execution of the event on the master system is monitored. Events may be monitored by tracking modifications to a database, obtaining a copy of client requests received by the master system, obtaining events to be executed on the database or by another suitable means. For example, a log file may be used to record all events executed on a master system, which may be read from, to monitor events executed on the database. In another embodiment of the invention, the master system may actively send out event notifications for all events executed on the master system.

In accordance with one or more embodiments of the invention, the event executed on the master system, discussed above, is also executed on at least one other master system within the multi-master replication network (Step 430). The event is executed on another master system and monitored in essentially the same manner as discussed above in Step 420.

In accordance with one or more embodiments of the invention, of the at least two identical events executed on the master systems, a single event is identified and designated as the selected event (Step 440). For example, all events executed on a master system that first received the corresponding request from the client system may be identified and designated as the selected events. In another embodiment of the invention, the event may be identified based on the first occurrence of the event in the monitored master systems. In another embodiment of the invention, both events may be identified as duplicates of one another and one of the events may be selected. In one embodiment of the invention, each event and identical replicates of the event may be assigned a unique event id number. Accordingly, the first event monitored with the unique event id number may be selected and subsequent events (i.e., duplicates of the same event) with the same event id number may not be selected.

In accordance with one or more embodiments of the invention, the selected event is executed on a slave system (Step 450). In one embodiment of the invention, the selected event may be executed on the slave system as described in Step 420 above. In another embodiment of the invention, metadata associated with the selected event may be stored in the slave system. In another embodiment of the invention, the event may be forwarded to another slave system through an intermediate system or to another master system for execution.

Exemplary Architecture

Figure 5:
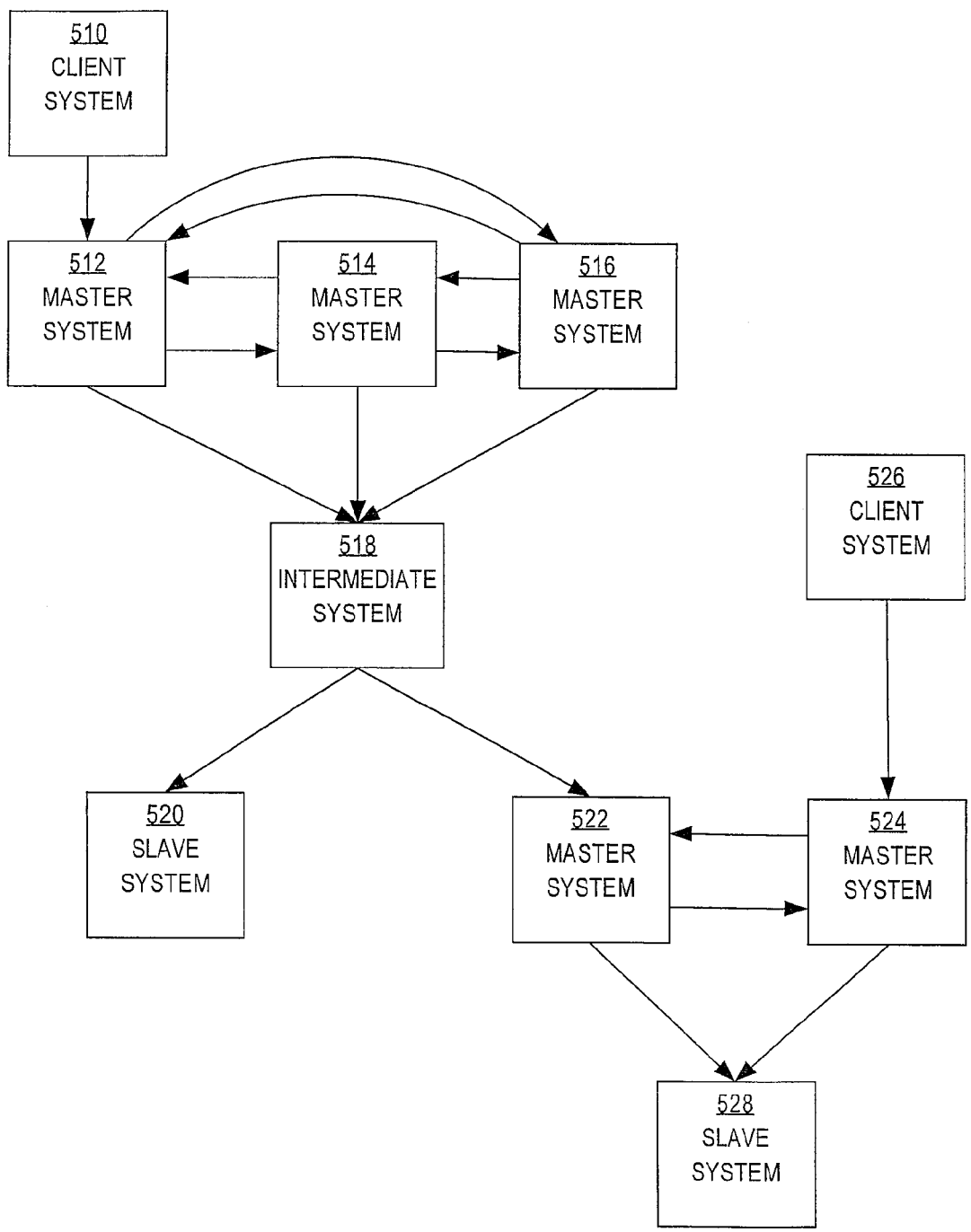
FIG. 5 is a schematic diagram that illustrates an exemplary architecture of a multi-master replication network according to one or more embodiments of the invention.

The block diagram show in FIG. 5 illustrates an exemplary logical architecture of a multi-master replication network with multiple master systems (e.g., master system 512, master system 514, master system 522, and master system 524), multiple slave systems (e.g., intermediate system 518, slave system 520, and slave system 528), and multiple client systems (client system 510 and client system 526) in accordance with one or more embodiments of the invention. In this example, two master systems clusters exist with varying permissions. The first cluster with master systems 512, 514, and 516 can only be accessed by client system 510 as client system 526 is not able to submit request to any of the master systems within the first cluster. The second cluster with master systems 522 and 524 may be accessed directly by client system 526 and indirectly accessed by client system 510 (as further described below).

In this exemplary multi-mater replication network a request for event A is received by master system 512 from client system 510. The event A is executed on master system 512 and replicated by execution on master system 514 and master system 516. The intermediate system 518, which is essentially a slave system that forwards events instead of executing them, monitors the execution of event A on the three master systems. In this scenario, master system 512 is designated as the active master system because master system 512 is the system receiving the request for event A from the client system 510. Accordingly, the intermediate system 518 that is monitoring the three master systems, simply identifies events executed on the active master system 512 while ignoring events executed on master system 514 and master system 516. Further, the intermediate system 518 forwards event A (or metadata associated with event A) to slave system 520 and master system 522. Slave system 520 executes event A on an associated data repository to back up the data stored in the first cluster of master systems.

In the second cluster, master system 522 executes event A received from intermediate system 518, and master system 524 replicates event A executed on master system 522 by also executing event A. Furthermore, in the second cluster, master system 524 receives a request for event B from client system 526 which is executed and replicated by master system 522 by execution of the same event B. Accordingly, in the second cluster, both master system 522 and master system 524 are active masters that each receive an event and further replicate the events received by the other master in the cluster. In this cluster, the slave system 528 first monitors execution of event A on master system 522 and second monitors execution of event A on master system 524. The slave system 528 determines that master system 522 is the originating system of event A because the request to execute event A was first received by master system 522. Accordingly, the slave system 528 executes metadata associated with event A from master system 522 and executes the event A on the slave system (i.e., an associated repository associated with the slave system). Next, the slave system 528 monitors the execution of event B on master system 522 and master system 524. In this case, the slave system determines that master system 524 is the originating system because master system 524 first received the request for execution of event B from client system 526. Accordingly, slave system 528 obtains event B from master system 524 and executes event B on an associated data repository.

Hardware Overview

Figure 6:
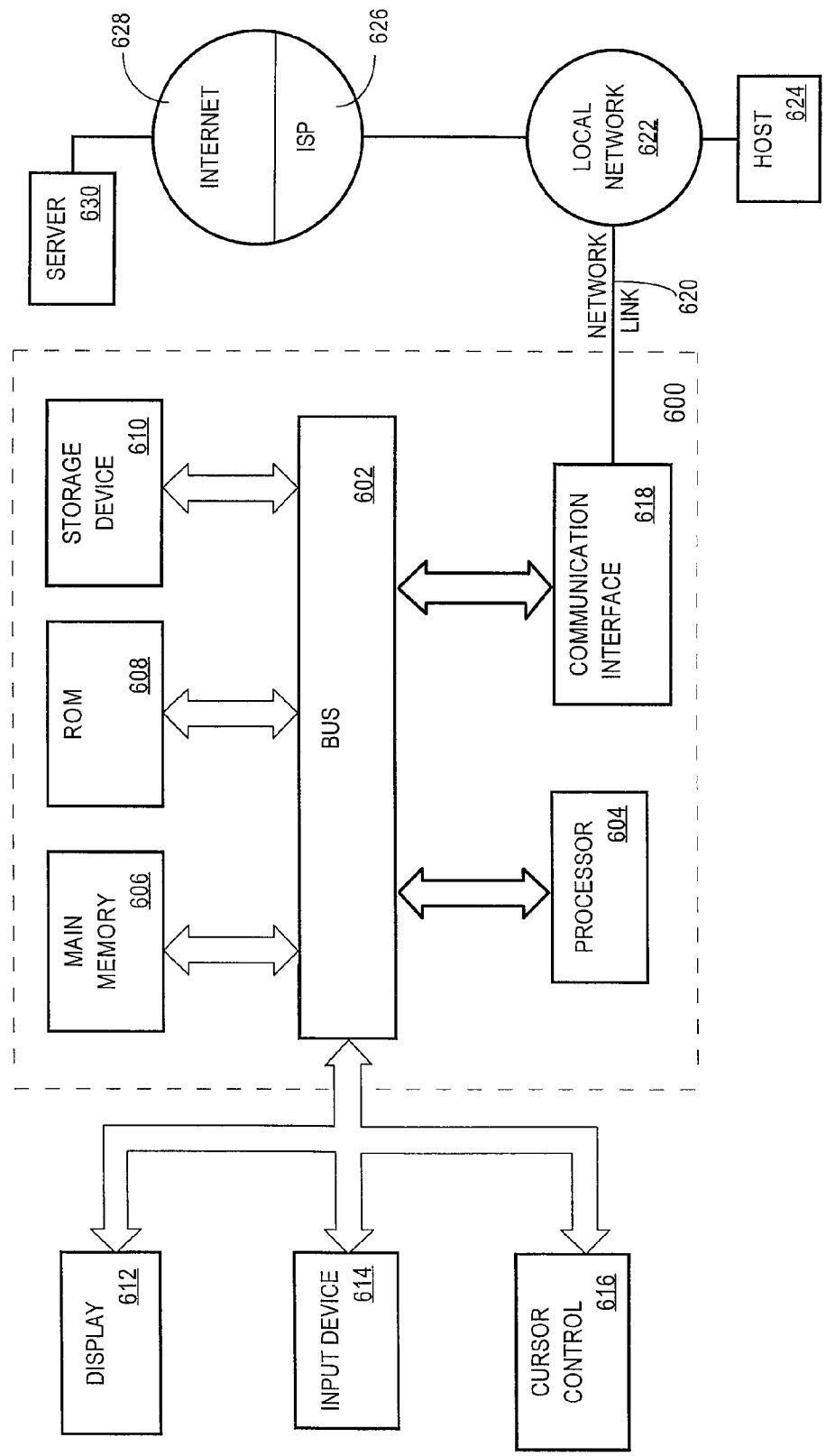
FIG. 6 is a block diagram of a system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for executing an event in a multi-master replication network, comprising:
    monitoring events executed on a first master system in a multi-master replication network and identifying occurrence of a first event executed on the first master system;
    replicating the first event to a second master system in the multi-master replication network and executing the replicated first event on the second master system as a second event;
    monitoring events executed on the second master system and identifying occurrence of the second event executed on the second master system;
    determining the first event and the second event to be identical;
    selecting, by a slave system, a first occurring event of the first event and the second event for execution on the slave system in the multi-master replication network without selecting the other event of the first event and the second event for execution on the slave system in response to determining that the first event and second event are identical, the slave system is a slave of both the first master system and the second master system, and selecting the first occurring event comprises:
        designating the first master system as an originating system based on the first master system receiving a request from a client system to execute the first event, and
        identifying the selected first occurring event based on the originating system; and
    executing, by the slave system, the selected event.

2. The method of claim 1, further comprising:
    forwarding the selected first occurring event by an intermediate system to the slave system prior to executing the selected first occurring event on the slave system.

3. The method of claim 1, wherein execution of the first event on the first master system comprises modifying a first data repository associated with the first master system, wherein execution of the second event on the second master system comprises modifying a second data repository associated with the second master system, and wherein executing the selected first occurring event on the slave system comprises modifying a third data repository associated with the slave system.

4. The method of claim 3, wherein the slave system receives the selected first occurring event using a MySQL protocol.

5. The method of claim 4, wherein the data repository associated with the slave system comprises a MySQL database, and wherein modifying the data repository associated with the slave system comprises updating the MySQL database based on the information.

6. An apparatus for executing an event in a multi-master replication network comprising:
    one or more subsystems implemented at least partially in hardware, configured to monitor events executed on a first master system in a multi-master network and identify occurrence of a first event executed on the first master system;
    one or more subsystems implemented at least partially in hardware, configured to replicate the first event to a second master system in the multi-master replication network and execute the replicated first event on the second master system as a second event;

one or more subsystems implemented at least partially in hardware, configured to monitor events executed on the second master system and identify occurrence of the second event executed on the second master system;

one or more subsystems implemented at least partially in hardware, configured to determine the first event and the second event to be identical;

one or more subsystems implemented at least partially in hardware, configured to select, by a slave system, a first occurring event of the first event and the second event for execution on the slave system without selecting the other event of the first event and the second event for execution on the slave system in response to determination that the first event and the second event are identical, the slave system is a slave of both the first master system and the second master system, and selection of the first occurring event comprises:

one or more subsystems implemented at least partially in hardware, configured to designate the first master system as an originating system based on the first master system receiving a request from a client system to execute the first event, and one or more subsystems implemented at least partially in hardware, configured to identify the selected first occurring event based on the originating system; and one or more subsystems implemented at least partially in hardware, configured to execute, by the slave system, the selected event.

7. The apparatus of claim 6, further comprising:

one or more subsystems implemented at least partially in hardware, configured to forward the selected first occurring event to the slave system prior to the slave system executing the selected first occurring event.

8. The apparatus of claim 6, wherein execution of the first event by the first master system comprises modifying a first data repository associated with the first master system, wherein execution of the second event by the second master system comprises modifying a second data repository associated with the second master system, and wherein execution of the selected first occurring event by the slave system comprises modifying a third data repository associated with the slave system.

9. The apparatus of claim 8, wherein the slave system obtains the selected first occurring event using a MySQL protocol.

10. The apparatus of claim 9, wherein the data repository associated with the slave system comprises a MySQL database, and wherein modifying the data repository associated with the slave system comprises updating the MySQL database based on the information.

11. A non-transitory computer readable medium storing software instructions for executing an event in a multi-master replication network, the software instructions comprising:

monitoring events executed on a first master system in a multi-master replication network and identifying occurrence of a first event executed on the first master system;

replicating the first event to a second master system in the multi-master replication network and executing the replicated first event on the second master system as a second event;

monitoring events executed on the second master system and identifying occurrence of the second event executed on the second master system;

determining the first event and the second event to be identical;

selecting, by a slave system, a first occurring event of the first event and the second event for execution on the slave system in the multi-master replication network without selecting the other event of the first event and the second event for execution on the slave system in response to determining that the first event and second event are identical, the slave system is a slave of both the first master system and the second master system, and selecting the first occurring event comprises:

designating the first master system as an originating system based on the first master system receiving a request from a client system to execute the first event, and identifying the selected first occurring event based on the originating system; and executing, by the slave system, the selected event.

12. The non-transitory computer readable medium of claim 11, wherein the instructions further comprises:

forwarding the selected first occurring event by an intermediate system to the slave system prior to executing the selected first occurring event on the slave system.

13. The non-transitory computer readable medium of claim 11, wherein execution of the first event on the first master system comprises modifying a first data repository associated with the first master system, wherein execution of the second event on the second master system comprises modifying a second data repository associated with the second master system, and wherein executing the selected first occurring event on the slave system comprises modifying a third data repository associated with the slave system.

14. The non-transitory computer readable medium of claim 13, wherein the slave system receives the selected first occurring event using a MySQL protocol.

15. The non-transitory computer readable medium of claim 14, wherein the data repository associated with the slave system comprises a MySQL database, and wherein modifying the data repository associated with the slave system comprises updating the MySQL database based on the information.

* * * * *